(12) United States Patent
Newton et al.

(10) Patent No.: US 8,880,592 B2
(45) Date of Patent: Nov. 4, 2014

(54) USER INTERFACE IMPLEMENTATION FOR PARTIAL DISPLAY UPDATE

(75) Inventors: Aaron Newton, San Francisco, CA (US); Philip Zeyliger, San Francisco, CA (US)

(73) Assignee: Cloudera, Inc., Palo Alto, CA (US)

( * ) Notice: Subject to any disclaimer, the term of this patent is extended or adjusted under 35 U.S.C. 154(b) by 88 days.

(21) Appl. No.: 13/077,909

(22) Filed: Mar. 31, 2011

(65) Prior Publication Data

US 2012/0254292 A1 Oct. 4, 2012

(51) Int. Cl.
G06F 15/16 (2006.01)
G06F 9/44 (2006.01)
H04L 29/08 (2006.01)

(52) U.S. Cl.
CPC .............. *G06F 9/4443* (2013.01); *H04L 67/02* (2013.01); *H04L 67/36* (2013.01)
USPC ............................ 709/203; 709/201; 709/217

(58) Field of Classification Search
USPC ................................................ 709/217–225
See application file for complete search history.

(56) References Cited

U.S. PATENT DOCUMENTS

| | | |
|---|---|---|
| 5,325,522 A | 6/1994 | Vaughn |
| 5,825,877 A | 10/1998 | Dan et al. |
| 6,542,930 B1 | 4/2003 | Auvenshine |
| 6,553,476 B1 | 4/2003 | Ayaki et al. |
| 6,651,242 B1 | 11/2003 | Hebbagodi et al. |
| 6,678,828 B1 | 1/2004 | Pham et al. |
| 6,687,847 B1 | 2/2004 | Aguilera et al. |
| 6,931,530 B2 | 8/2005 | Pham et al. |
| 7,031,981 B1 | 4/2006 | DeLuca et al. |
| 7,069,497 B1 | 6/2006 | Desai |
| 7,107,323 B2 | 9/2006 | Hara et al. |
| 7,143,288 B2 | 11/2006 | Pham et al. |
| 7,325,041 B2 | 1/2008 | Hara et al. |
| 7,487,228 B1 | 2/2009 | Preslan et al. |
| 7,496,829 B2 | 2/2009 | Rubin et al. |
| 7,620,698 B2 | 11/2009 | Hara et al. |
| 7,631,034 B1 | 12/2009 | Haustein et al. |
| 7,640,512 B1 * | 12/2009 | Appling ........................ 715/771 |
| 7,653,668 B1 | 1/2010 | Shelat et al. |
| 7,685,109 B1 | 3/2010 | Ransil et al. |
| 7,698,321 B2 * | 4/2010 | Hackworth ................... 707/689 |
| 7,734,961 B2 | 6/2010 | Almoustafa et al. |
| 7,818,313 B1 | 10/2010 | Tsimelzon et al. |
| 7,831,991 B1 | 11/2010 | Kiraly |
| 7,937,482 B1 | 5/2011 | Vermeulen et al. |
| 7,970,861 B2 | 6/2011 | Simitci et al. |

(Continued)

OTHER PUBLICATIONS

U.S. Appl. No. 13/854,773, filed Jan. 12, 2013, Garcia.

(Continued)

*Primary Examiner* — Yasin Barqadle
(74) *Attorney, Agent, or Firm* — Perkins Coie LLP

(57) ABSTRACT

Systems and methods for user interface implementation for partial display update are disclosed. One embodiment of the method, which may be embodied on a system includes, in a response received from a web server, identifying, for a web page, a set of elements able to be updated partially as displayed without refreshing the user interface in its entirety, detecting, in the response, updated elements in the set of elements that have been updated from a value displayed in the user interface, and/or partially updating the user interface to reflect changes to the updated elements in the web page without refreshing other portions of the user interface.

17 Claims, 11 Drawing Sheets

(56) References Cited

U.S. PATENT DOCUMENTS

| | | | |
|---|---|---|---|
| 8,024,560 B1 | 9/2011 | Alten | |
| 8,069,267 B2 * | 11/2011 | Powers-Boyle et al. | 709/246 |
| 8,108,338 B2 | 1/2012 | Castro et al. | |
| 8,108,771 B2 | 1/2012 | Chijiiwa et al. | |
| 8,306,919 B2 | 11/2012 | Sakamura et al. | |
| 8,311,980 B2 | 11/2012 | Saito et al. | |
| 8,468,244 B2 | 6/2013 | Redlich et al. | |
| 8,484,716 B1 | 7/2013 | Hodgson et al. | |
| 8,655,939 B2 | 2/2014 | Redlich et al. | |
| 8,667,267 B1 | 3/2014 | Garcia et al. | |
| 2002/0055989 A1 | 5/2002 | Stringer-Calvert et al. | |
| 2002/0073322 A1 | 6/2002 | Park et al. | |
| 2002/0138762 A1 | 9/2002 | Horne | |
| 2002/0174194 A1 | 11/2002 | Mooney et al. | |
| 2003/0051036 A1 | 3/2003 | Wang et al. | |
| 2003/0055868 A1 | 3/2003 | Fletcher et al. | |
| 2003/0093633 A1 | 5/2003 | Thiesfeld et al. | |
| 2004/0003322 A1 | 1/2004 | Collins et al. | |
| 2004/0059728 A1 | 3/2004 | Miller et al. | |
| 2004/0103166 A1 | 5/2004 | Bae et al. | |
| 2004/0172421 A1 | 9/2004 | Saito et al. | |
| 2004/0186832 A1 | 9/2004 | Jardin | |
| 2005/0044311 A1 | 2/2005 | Lahiri et al. | |
| 2005/0071708 A1 | 3/2005 | Bartfai et al. | |
| 2005/0091244 A1 | 4/2005 | Marcotte | |
| 2005/0138111 A1 | 6/2005 | Aton et al. | |
| 2005/0171983 A1 | 8/2005 | Deo et al. | |
| 2005/0182749 A1 | 8/2005 | Matsui | |
| 2006/0020854 A1 | 1/2006 | Cardona et al. | |
| 2006/0050877 A1 | 3/2006 | Nakamura | |
| 2006/0143453 A1 | 6/2006 | Imamoto et al. | |
| 2006/0156018 A1 | 7/2006 | Lauer et al. | |
| 2006/0224784 A1 | 10/2006 | Nishimoto et al. | |
| 2006/0247897 A1 | 11/2006 | Lin | |
| 2007/0100913 A1 | 5/2007 | Sumner et al. | |
| 2007/0113188 A1 * | 5/2007 | Bales et al. | 715/742 |
| 2007/0136442 A1 * | 6/2007 | Palma et al. | 709/219 |
| 2007/0177737 A1 | 8/2007 | Jung et al. | |
| 2007/0180255 A1 | 8/2007 | Hanada et al. | |
| 2007/0186112 A1 | 8/2007 | Perlin et al. | |
| 2007/0226488 A1 | 9/2007 | Lin et al. | |
| 2007/0234115 A1 | 10/2007 | Saika | |
| 2007/0255943 A1 | 11/2007 | Kern et al. | |
| 2007/0282988 A1 | 12/2007 | Bornhoevd et al. | |
| 2008/0140630 A1 | 6/2008 | Sato et al. | |
| 2008/0168135 A1 | 7/2008 | Redlich et al. | |
| 2008/0244307 A1 | 10/2008 | Dasari et al. | |
| 2008/0256486 A1 | 10/2008 | Hagiwara | |
| 2008/0263006 A1 | 10/2008 | Wolber et al. | |
| 2008/0276130 A1 | 11/2008 | Almoustafa et al. | |
| 2008/0307181 A1 | 12/2008 | Kuszmaul et al. | |
| 2009/0013029 A1 | 1/2009 | Childress et al. | |
| 2009/0177697 A1 | 7/2009 | Gao et al. | |
| 2009/0259838 A1 | 10/2009 | Lin | |
| 2009/0307783 A1 | 12/2009 | Maeda et al. | |
| 2010/0008509 A1 | 1/2010 | Matsushita et al. | |
| 2010/0010968 A1 | 1/2010 | Redlich et al. | |
| 2010/0070769 A1 | 3/2010 | Shima et al. | |
| 2010/0131817 A1 | 5/2010 | Kong et al. | |
| 2010/0179855 A1 | 7/2010 | Chen et al. | |
| 2010/0198972 A1 | 8/2010 | Umbehocker | |
| 2010/0296652 A1 | 11/2010 | Nakayama et al. | |
| 2010/0306286 A1 * | 12/2010 | Chiu et al. | 707/827 |
| 2010/0325713 A1 | 12/2010 | Kurita et al. | |
| 2011/0055578 A1 | 3/2011 | Resch | |
| 2011/0078549 A1 | 3/2011 | Thueringer et al. | |
| 2011/0119328 A1 | 5/2011 | Simitci et al. | |
| 2011/0179160 A1 | 7/2011 | Liu et al. | |
| 2011/0228668 A1 | 9/2011 | Pillai et al. | |
| 2011/0246816 A1 | 10/2011 | Hsieh et al. | |
| 2011/0246826 A1 | 10/2011 | Hsieh et al. | |
| 2011/0276396 A1 | 11/2011 | Rathod | |
| 2011/0276495 A1 | 11/2011 | Varadarajan et al. | |
| 2011/0302417 A1 | 12/2011 | Whillock et al. | |
| 2011/0307534 A1 | 12/2011 | Peng et al. | |
| 2012/0036357 A1 | 2/2012 | Struik | |
| 2012/0102072 A1 | 4/2012 | Jia et al. | |
| 2012/0130874 A1 | 5/2012 | Mane et al. | |
| 2012/0131341 A1 | 5/2012 | Mane et al. | |
| 2013/0041872 A1 | 2/2013 | Aizman et al. | |
| 2013/0054976 A1 | 2/2013 | Brown et al. | |
| 2013/0304761 A1 | 11/2013 | Redlich et al. | |

OTHER PUBLICATIONS

U.S. Appl. No. 13/854,773, filed Apr. 1, 2013, Kirkland et al.

Koe et al., "A Study of Encryption Algorithm for RFID tag (SEED: 6 Rounds×64 bit block)," IEEE, s008, pp. 672-677.

Kim et al., Design and Implementation of a Private and Public Key Crypto Processor and its Application to a Security System, IEEE, Feb. 2004, vol. %0, Issue 1, pp. 214-224.

Du et al., "A Pairwise Key Predistribution Scheme for Wireless Sensor Networks," ACM, May 2005, vol. 8 Issue 2, pp. 228-258.

Cheng, Security Attack Safe Modle and Cloud-Based One-Time Password Tokens Using Rubbing Encryption Algorithm, ACM, Jun. 2011, pp. 304-336.

Non-Final Office Action for U.S. Appl. No. 13/362,685, mailed Apr. 29, 2013, 23 pgs.

Exam Report for GB1403929.1, Applicant: Cloudera, Inc, Mailed May 2, 2014, 6 pages.

Babaoglu, O., and K. Marzullo, "Consistent global states of distributed systems: Fundamental concepts and mechanisms," *Distributed Systems,* 53 pages, Jan. 1993.

Corbett et al., "Spanner: Google's Globally Distributed Database," *Transactions on Computer Systems (TOCS),* vol. 31, No. 3, 14 pages, Aug. 2013.

Lamport, L., "Time, clocks, and the ordering of events in a distributed system," *Communications of the ACM,* vol. 21, No. 7, pp. 558-565, Jul. 1978.

Stoller, S.D., "Detecting global predicates in distributed systems with clocks," *Distributed Computing,* vol. 13, No. 2, pp. 85-98, Feb. 2000.

Beomseok Nam et al: "Spatial indexing of distributed multidimensional datasets", Cluster Computing And The Grid, 2005. CCCGRID 2005. IEEE International Symposium On Cardiff~Wales, UK May 9-12, 2005, Piscataway, NJ, USA, IEEE, Piscataway, NJ, USA, vol. 2, May 9. 2005, pp. 743-750.

Chapter 25: Distributed Databases ED—Ramez Elmasri; Shamkant B Navathe (eds), Jan. 1, 2011, Fundamentals Of Database Systems (Sixth Edition), Addison-Wesley, pp. 877-927.

European Search Report for European Application No. 14157984.7, mailing date Jun. 6, 2014, 10 pages.

Kossmann, Donald, "The State Of The Art In Distributed Query Processing," ACM Computing Surveys, vol. 32, No. 4, Dec. 1, 2000, pp. 422-469.

Tamer Dzsu et al: "Principles of Distributed Database Systems", Principles of Distributed Database Systems, XX, XX, Jan. 1, 1991, pp. 74-93.

* cited by examiner

400

| Name | Key | Value |
|---|---|---|
| Firefox | CPU | 23% |
| Firefox | Memory | 10% |

| Name | Key | Value |
|---|---|---|
| Firefox | CPU | *23 |
| Firefox | Memory | *14  ← 404 |
| Firefox | Disk | 20% |

| Name | Key | Value |
|---|---|---|
| Firefox | CPU | 23% |
| Firefox | Memory | 14% |
| Firefox | Disk | 20% |

*FIG. 4C*

USER INTERFACE IMPLEMENTATION FOR PARTIAL DISPLAY UPDATE

BACKGROUND

Live views in web page user interfaces typically include multiple elements with values that need to be constantly refreshed in the user interface such that the most up-to-date values are available to the user. Such live views featuring constantly or frequently updated values can include, score tracking for games, sporting events, resource utilization, bandwidth usage/availability, financial data, any information that is changing in real-time or near real time etc. However, refreshing the entire view or frame in the web page every time one or few values have been updated can significantly negatively impact the user's experience in interacting with the web page.

BRIEF DESCRIPTION OF THE DRAWINGS

FIG. 4A-4C graphically depicts how displayed objects are partially updated in a user interface based on a web server response.

DETAILED DESCRIPTION

Figure 1:
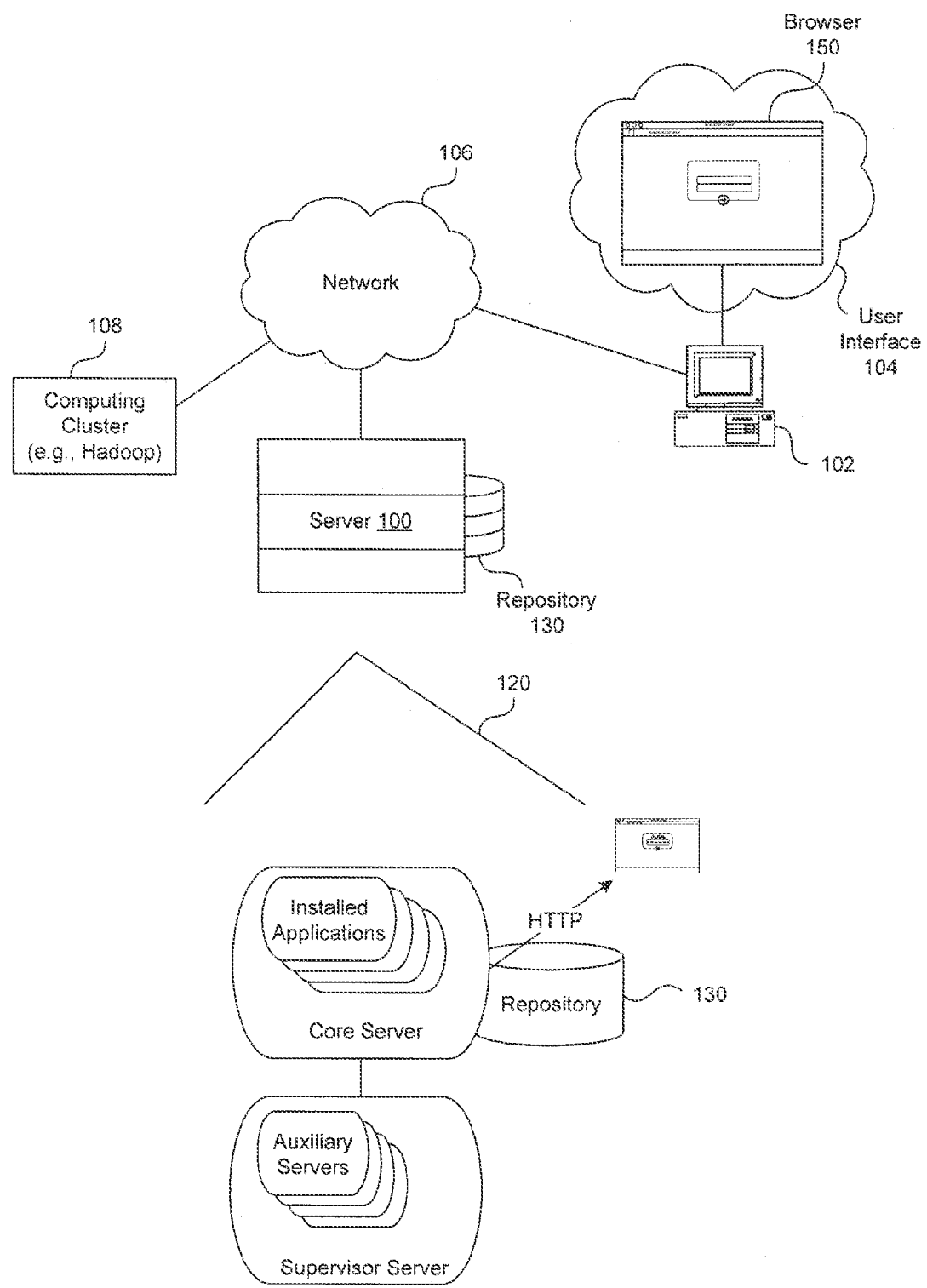
FIG. 1 illustrates a block diagram of a server for hosting user interface applications able to communicate with a client device web browser and a computing environment through a network. An exploded view of an example of a server configuration is also illustrated.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art, to which this disclosure pertains. In the case of conflict, the present document, including definitions will control.

Embodiments of the present disclosure include systems and methods for interactive user interface implementation for partial display update.

FIG. 1 illustrates a block diagram of a server 100 for hosting user interface applications able to communicate with a client device 102 web browser 150 and a computing environment 108 through a network 106. An exploded view 120 of an example of a server configuration is also illustrated.

The client device 102 can be any system and/or device, and/or any combination of devices/systems that is able to establish a connection with another device, a server and/or other systems. The client device 102 typically includes a display or other output functionalities to present data exchanged between the devices to a user, for example through a user interface 104. The user interface 104 can be used to access a web page via browser 150. The web page can include frames containing applications which can handle its own server requests, independent of the other frames in the web page, and can partially update a display screen to change on those elements with updated values. The browser 150 can also be used by developers to access a UI development environment hosted by the server 100. In one embodiment, the UI development environment enables developers to build interactive UI features in an application by specifying mark-up tags in HTML. Additionally, the UI development environment enables UI implementations with partial updating to be developed. The application that is developed may he used to access any backend services and can include a Hadoop enabled backend system.

The client device 102 can be, but are not limited to, a server desktop, a desktop computer, a thin-client device, an internet kiosk, a computer cluster, a mobile computing device such as a notebook, a laptop computer, a handheld computer, a mobile phone, a smart phone, a PDA, a Blackberry device, a Treo, and/or an iPhone, etc. In one embodiment, the client device 102 is coupled to a network 106.

In one embodiment, users or developers interact with the client device 102 (e.g., machines or devices) to access the server 100 and services provided therein. Specifically, users or software developers can develop applications and/or application front-ends (e.g., user interfaces) for accessing the computing cluster by interacting with the server 100 via the client device 102. The server 100 hosts applications with interactive user interfaces and a development environment used for such purpose. The development environment allows developers to create HTML applications with interactive features without significant use of CSS or JavaScript thus significantly reducing time and resource to deployment. Applications can also he built to feature partially updatable elements in the user interface.

Additionally, the server 100 hosts applications with user interfaces with partially updatable displays. In such an implementation of a user interface, the display can change only those features or elements that have been updated since the last received web response. Such partial refreshing of a user interface on a display screen allows a user to interact with a user interface without the entire screen being refreshed every time one or a few values need to be updated, creating an unpleasant or inconvenient user experience. The server 100 can also host a development environment which enables front end UI development and implementation of partially updatable displays.

For example, the server 100 can generate an HTTP response to an HTTP request, where the HTTP response includes a list which identifies multiple elements of which at least one includes a value that is updated from a previous value. The server 100 can transmit the HTTP response to a client device which generated the HTTP request. The list can subsequently be parsed by the client 102 to identify the at least one element which includes the value which has been updated and to render the updated value in a user interface to an application which made the HTTP request. The updated value can be rendered on the display without refreshing the user interface in its entirety. Such an implementation can prevent or minimize potential user experience disruptions in the event that the user is interacting with an object in the UI feature which contains some elements that need to be updated.

In one embodiment, end users can interact with the computing cluster 108 (e.g., machines or devices), via browser 150 through applications hosted cm server 100. As a results of the user interaction, the cluster 108 can generate datasets such as log files to be collected and aggregated. The file can include logs, information, and other metadata about clicks, feeds, status updates, data from applications, and associated properties and attributes. The computer cluster 108 can be managed under the Hadoop framework (e.g., via the Hadoop distributed file system or other file systems which may be distributed file systems, non-distributed file systems, distributed fault-tolerant file systems, parallel file systems, peer-to-peer file systems, including but not limited to, CFS, Unilium, OASIS, WebDFS, CloudStore, Cosmos, dCache, Parallel Virtual File System, Starfish, DFS, NFS, VMFS, OCFS, CXFS, DataPlow SAN File System, etc.). Such log files and analytics can be accessed or manipulated through applications hosted by the server 100. Interactive user interfaces for applications hosted on the server 100 can be used to access backend services hosted in the cluster 108, for example.

In one embodiment, the server 100 includes user interface modules to implement interactive elements in a windowing environment (e.g., a web page in a browser) and user interface development modules for developer use in developing interactive UI features using declarative HTML (e.g., without the need for significant use of JavaScript). The server 100 can include multiple devices including a core server which hosts installed applications and auxiliary servers which manage auxiliary processes, which may be ran by applications on the core server. In some instances, the auxiliary servers are coupled to a supervisor server which initiates the processes in the auxiliary servers.

Figure 2:
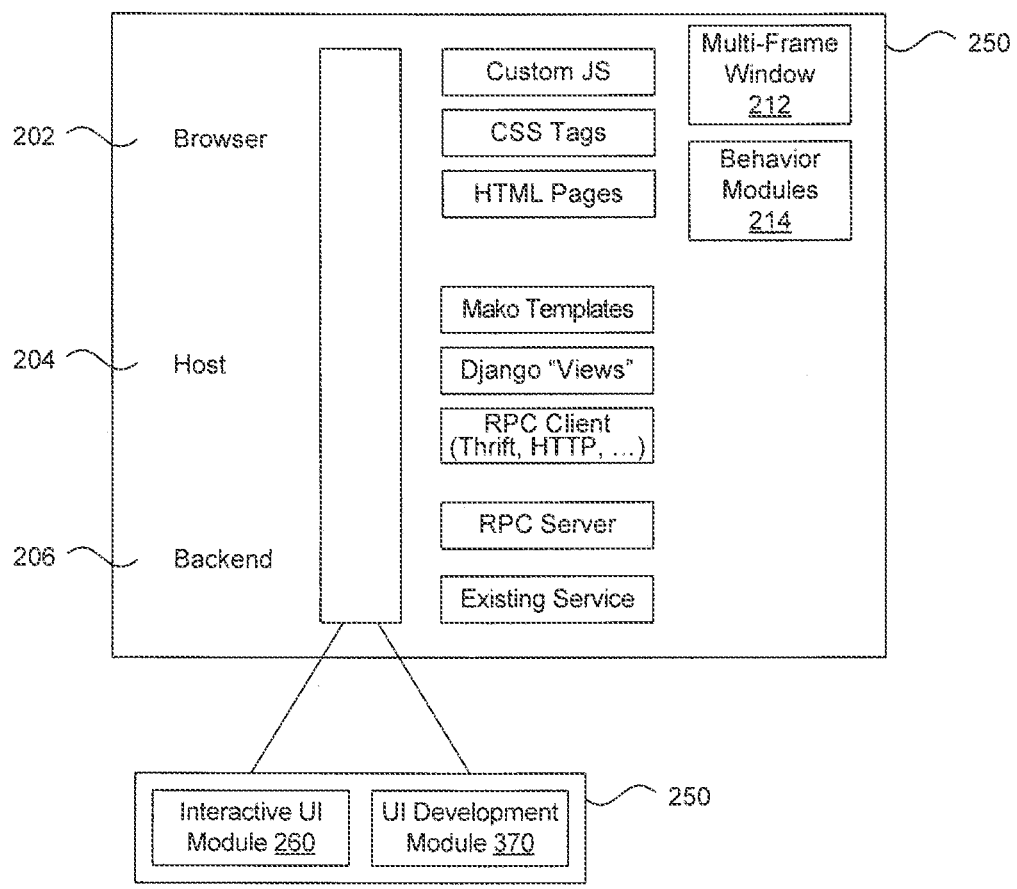
FIG. 2 depicts an architectural view of a user interface application managed by a user interface module which can span a browser tier, a host server, and/or a backend.
Figure 3:
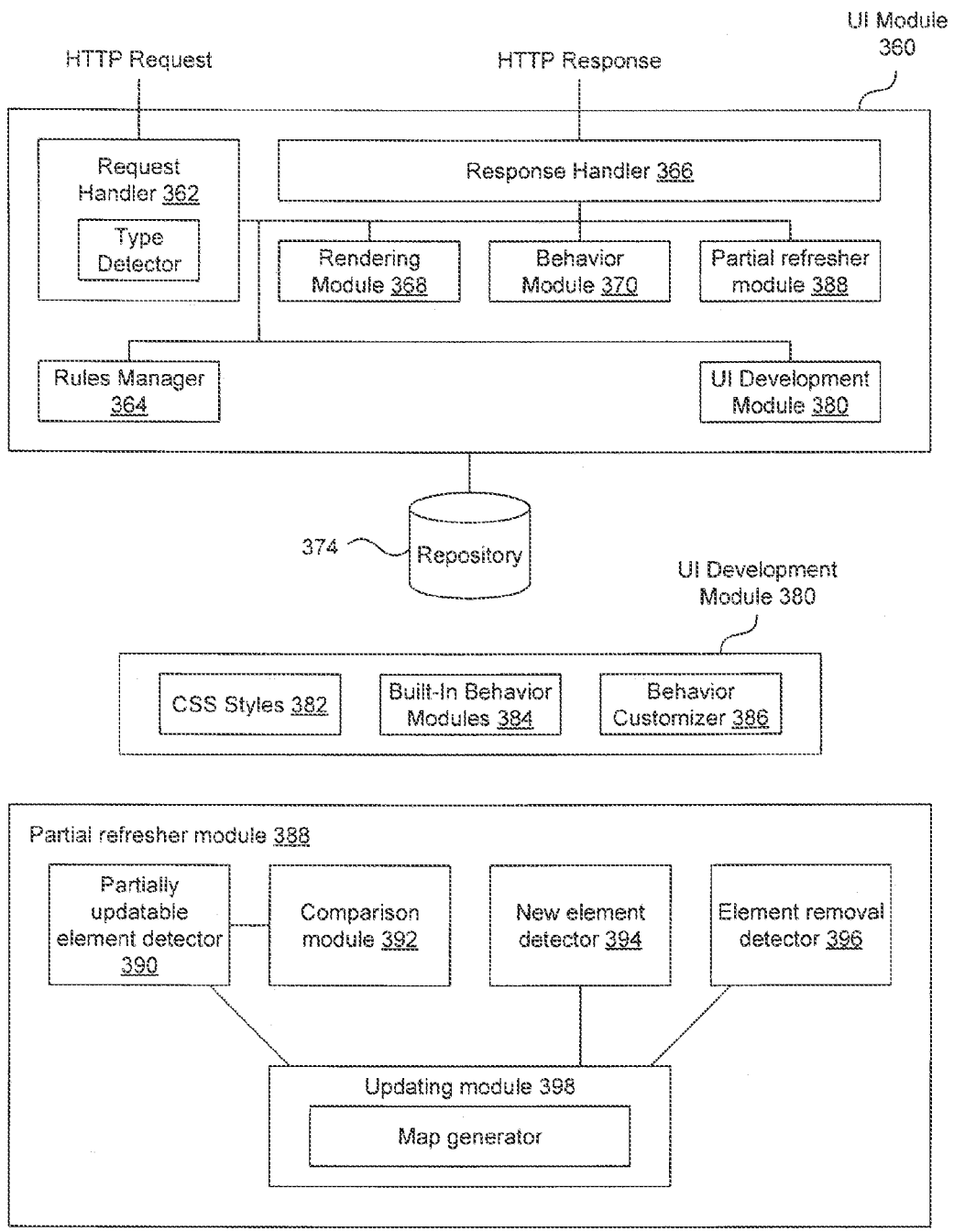
FIG. 3 depicts a block diagram illustrating example components of an interactive UI module and a UI development module.

The functionalities and features of the UI modules and UI development modules are described with further reference to the examples of FIG. 2-3.

The network 106, over which the client device 102, server 100, and cluster 108 communicate may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices, host server, and may appear as one or more networks to the serviced systems and devices. In one embodiment, communications to and from the client device 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. The physical connections of the Internet and the protocols and communication procedures of the Internet and the web are well known to those of skill in the relevant art. For illustrative purposes, it is assumed the network 106 broadly includes anything from a minimalist coupling of the components illustrated in the example of FIG. 1, to every component of the Internet and networks coupled to the Internet.

In addition, communications can he achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, WiFi, Fixed Wireless Data, 2G, 2.5G, 3G, 4G, LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client device 102 can be coupled to the network (e.g., Internet) via a dial up connection, a digital subscriber loop (DSL, ADSL), cable modem, and/or other types of connection. Thus, the client device 102 can communicate with remote servers (e.g., web server, host server, mail server, and instant messaging server) that provide access to user interfaces of the World Wide Web via a web browser, for example.

The repository 130, though illustrated to be coupled to the server 100, can also be coupled to the computing cluster 108, either directly or via network 106. In one embodiment, the repository 130 can store session data from web URL retrieval and view generation processes to facilitate the host 100 in generating interactive user interface features. For example, the repository 130 can store session information and session states (e.g., session complete, session in progress, etc.). In addition, the repository 130 can be used to store templates, style sheets, or job designs for use in front end development. In one embodiment, the repository 130 stores session states including values for elements displayed in an application user interface. Such stored values can be used by the server 100 for comparison with new responses with values for these elements to detect whether updates to the user interface is needed to reflect any new values for existing elements, or if elements need to be added or removed from the user interface.

The repository 130 can additionally store software, descriptive data, images, system information, drivers, collected datasets, aggregated datasets, log tiles, analytics of collected datasets, enriched datasets, etc. The repository may be managed by a database management system (DBMS), for example but not limited to, Oracle, DB2, Microsoft Access, Microsoft SQL Server, MySQL, FileMaker, etc.

The repository can be implemented via object-oriented technology and/or via text files, and can be managed by a distributed database management system, an object-oriented database management system (OODBMS) ConceptBase, FastDB Main Memory Database Management System, JDO-Instruments, ObjectDB, etc.), an object-relational database management system (ORDBMS) (e.g., Informix, OpenLink Virtuoso, VMDS, etc.), a file system, and/or any other convenient or known database management package.

FIG. 2 depicts an architectural view of a user interface application managed by a user interface module 250 which can span a browser tier 202, a host tier 204, and/or a backend 206.

The browser tier 202 includes the user interface and the user's interaction with web pages (e.g., HTML web pages) and applications in a windowing environment such as a web browser. In one embodiment, the browser tier 202 includes a multi-framed window 212 (e.g., multiple frames in a web page) which depicts individual applications that are able to handle their own HTTP request. For example, the multi-framed window 212 can include a web-browser with multiple frames with applications that handle HTTP requests independent of other frames. The responses received from the requests can also be rendered in each of the multiple frames individually in the same web page independent of the rendering process in the other frames. A graphical example of a multi-frame window 212 is illustrated in the example of FIG. 4A-4B.

In one embodiment, the multi-frame window 212 includes a frame with user interface features having elements that can be partially updated (e.g., changing some elements of the feature without refreshing the screen in its entirety). The partial updating of updated elements can occur in one specific frame of the web page or other windowing environment, independent of the operation or states in the other frames.

One embodiment of the browser tier 202 further includes behavior module 214 which, during operation, handles the interactive behaviors implemented for user interface elements defined using declarative HTML. The interactive behaviors can be defined as software modules (e.g., in the UI development module 270) for use in development of an application's front end. The UI behaviors can be executed by the behavior module 214 by replacing mark-up tags with the corresponding software modules. For example, an HTML response can be annotated with instructions for interactive behaviors, which allows for multiple behaviors at once.

The host tier 204 includes logic to host the applications and can provide default or predefined templates (e.g., Mako templates) and views (e.g., Django views) for use in UI/front end development. An application front end developed by a user using the UI module 205 can include a view function (e.g., a Django view function) which processes an HTTP request and the associated template to render the server response into HTML. Note that while the application front-end (user interface) can be developed using the UI module 250 without significant reliance on Javascript can still include some custom JavaScript and CSS styles.

The backend tier 206 can include backend services such as external services (e.g., Hive metastore, Hadoop MapReduce) with which the applications hosted on tier 204 may interact. For example, the backend can include a RPC (remote procedure call) server (e.g., Beeswax server) which interacts with an RPC client in the host tier 204.

FIG. 3 depicts a block diagram illustrating example components of an UI module 360 and a UI development module 380.

In one embodiment, the UI development module 380 is implemented in the US module 360, as illustrated in the example of FIG. 3. Alternatively, the UI development module 380 may be partially or wholly external to the UI module 360 but coupled directly or through a network. The interactive UI module 360, can additionally include, a request handler 362, a rules manager 364, a response handler 366, a rendering module 368, a behavior module 370, and/or a partial refresher 372. The interactive UI module 360 may be further coupled a repository 374 and backend services 376. The UI development modules 380 can include a repository of CSS styles 382, behavior modules 384, and/or a behavior customizer 386. The repository of CSS styles 382 can include a collection of default style sheets with user interface components to be provided to developers to create applications in a development environment. Developers can also define their own CSS styles. Additional or less modules can be included the modules 360 and 380.

As used in this paper, a "module," a "manager", a "handler", or an "engine" includes a dedicated or shared processor and, typically, firmware or software modules that are executed by the processor. Depending upon implementation-specific or other considerations, the module, manager, hander, or engine can be centralized or its functionality distributed. The module, manager, hander, or engine can include special purpose hardware, firmware, or software embodied in a computer-readable medium for execution by the processor. As used in this paper, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the UI module 360 includes a request handler 362. The request handler 362 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality.

The request handler 362, in one embodiment, receives, manages, processes, intercepts, requests received as a response of an event occurring at a windowing environment. The windowing environment includes a user interface level environment through which a user interacts to manipulate or access applications. The windowing environment can include a browser (e.g., directory browser or web browser, etc.) through which user action triggers events which generates requests. In one embodiment, the request includes an HTTP request generated as a result of user action on a web page.

The event can be triggered in a frame of the web page, which can include multiple frames. The event can include, by way of example but not limitation, a form submit, a link click, or any other custom calls. One embodiment of the request handler 362 includes a type detector, which can identify the type of event which generated a request. The request type can be used by the rules manager 364, which may be implemented within the behavior module 370 to apply any type-specific processing or rendering procedures.

In one embodiment, the request handler 362 sends the request from the client device where the request was generated to a recipient device (e.g., a web server). The request handler 362 can process and send requests (e.g., HTTP requests or XML, HTTP requests) independently for events triggered in each of the multiple frames in a single browser, a single web page, or other windowing environment. For example, each of the multiple frames of the web page can include different applications which handle corresponding requests to the web server independent of the other applications loaded in other frames. Examples of a multi-frame windowing environment are illustrated graphically in FIG. 5A-B.

One embodiment of the UI module 360 includes a rules manager 364. The rules manager 364 can be implemented, example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality.

The rules manager 364 can determine and/or apply the rules to processing an HTTP server request and/or response. For example, the rules manager 364 can, in response to determining that a triggering event is a link selection, that custom actions, if applicable, could be applied. Examples of custom actions can include actions defined for a date picker element on a user interface which specifies that when a link for a date picker (element 'x') is clicked, focus instead on another element (element 'y'). Such a custom action can then he created as a behavior (e.g., by the behavior customizer module 386) for a date picker element, or other elements, can be created as a software module (e.g., widget) for re-use in implementing other date pickers, or other elements with a similar behavior.

Such custom action essentially corresponds to the behavior (e.g., including various forms of interactive features and behaviors) of a user interface element, such as a button, or link, etc. The custom actions can be predefined and provided to a developer and/or defined by a developer and reused in another application or by another developer. The custom action can be created as a re-usable module (e.g., for example, by the behavior customizer 386 of the UI development module 380) and provided as a software module by the behavior module 384 for others to use.

Built-in actions can also be defined through the built-in behavior modules 384 in the UI development module 380. Some examples of built in behavior modules include, form validation, customizable right-click context menus, sortable tables, tabbed interface elements, tool tips, date selector for input forms, etc. When content or a web page is loaded in response to receiving a server response, the behavior module 370 and load/render the content based on the custom action defined in the widget.

One embodiment of the UI module 360 includes a response handler 366 and a rendering module 368. The response handler 366 and the rendering module 368, can each be implemented, for example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality.

In one embodiment, the response handler 366 receives processes, retrieves, parses, and/or identifies a response received responsive to the request generated in a windowing environment. For example, the response handler 366 can process a web server response received from a web server in response to an HTTP request sent in response to an action triggered in a frame or a web page, browser, or other windowing environments.

In one embodiment, the response handler 366 can process the response in accordance with the rules set forth for the web server response (e.g., as provided by the rules manager 364) and rendered by the rendering module 368. In general, the response (e.g., HTTP response) received in response to the triggering event occurring in a frame, is handled independently of responses received for other frames in a common web page, browser, or windowing environment. The state of the frame for which a response is received is updated and Maintained by the response handler 366 independently of the activity of other frames. States of frames in a windowing environment can be stored and maintained in the repository 374 and accessed and updated accordingly when states are updated upon receiving a server response. For example, the response handler 366 can update the states maintained or stored for various frames in a windowing environment (e.g., a web page or browser).

In one embodiment, the response handler 366 receives the response and the rendering module 368 processes the response for rendering in the user interface. In one embodiment, the rendering module 368 also allows custom rules for rendering to be defined. The custom rules specify how to handle responses received from a web server. By default, the rendering Module 368 implements the following responses: an alert response, a confirm response, and a default response. The default response is performed when no interruption occurs based on the server response and proceeds with unloading and loading of new content. The alert response allows a user to select whether to proceed or to cancel the action. The confirm response similarly, confirms with the user whether the requested action is to be performed.

The rendering module 368 renders the display on a frame by frame basis, independent of the other frames in the same windowing environment, browser, or web page. For example, the rendering module 368 can unload the contents of each frame independent of the other frames on a web page. In general, the rendering module 368 renders the results of the web server response in the frame of the web page in which the event was triggered, independent of the other frames.

One embodiment of the UI module 360 includes a partial refresher module 372. The partial refresher module 372 can each be implemented, for example, as software embodied in a computer-readable medium or computer-readable storage medium on a machine, in firmware, in hardware, in a combination thereof, or in any applicable known or convenient device or system. This and other modules or engines described in this specification are intended to include any machine, manufacture, or composition of matter capable of carrying out at least some of the functionality described implicitly, explicitly, or inherently in this specification, and/or carrying out equivalent functionality.

In one embodiment, the partial refresher module 388 receives processes, retrieves, parses, and/or identifies a response received responsive to the request generated in a windowing environment to selectively update/refresh certain portions/elements of the user interface. For example, the partial refresher module 388 can process a web server response received from the response handler 366 to identify a set of elements (e.g., elements or features in a web page) that are able to be updated partially as displayed. The partial updating disclosed herein can be implemented in any HTML frames such as an iframe. Alternatively, the partial updating can be implemented in other types of frames, such as frames implemented in JavaScript. For example, partial updating may occur in a frame of the user interface, wherein, the frame contents are loaded and/or unloaded independent of other frames in the web page, such as the types of frames described in association with FIG. 5A-B.

In one embodiment, the set of elements can be identified in a list of objects provided by a web server in the response sent to the client and can be identified by the element detector 390. The partial updating of the displayed elements and features is performed (e.g., by the updating module 398) without the need to refresh the user interface in its entirety, to mitigate any potential disruptions in user experience while browsing the web or using other types of windowing environments.

Once the elements that can be partially updated are identified, the partial refresher module 388 can detect, in the response, the specific elements in the set of elements that have been updated from a value displayed in the user interface. The displayed value can be determined from a previous response received from an external entity such as a web server. Once the updated elements have been detected in the response, the partial refresher module 388 can partially update the user interface to reflect changes to the updated elements in the web page or other windowing environment without refreshing other portions of the user interface.

In one embodiment, the partial refresher module 388 compares received values for the set of elements with a set of previously stored values (e.g., can be stored as or with state session data in the repository 372) to detect the elements that have been updated, by for example, matching one HTML response against another HTML response through intelligent parsing. Such a comparison may be performed by the comparison module 392. The parsing and matching can be performed by, for example, "data binding", where a data structure (like JSON)) is mapped to the document structure. Other methods of detecting updated values for live objects on a web page can also be used. Once the updated values have been detected and updated, for example, by the updating module 398 in the user interface for display, the refresher module 388, can in one embodiment, generate a map of identifiers indicating which of the updated elements have been correspondingly updated in the user interface such that the same element is not injected into the display more than once. In some instances, the map can be generated by the map generator of the updating module.

In addition, the partial refresher module 388 can detect, in the response, new elements in addition to the set of elements previously received and inject the new elements for display in the user interface for the web page without changing display of other elements in the set of elements in the user interface (e.g., by the updating module 398). The new elements may be detected by detector 394.

Similarly, the partial refresher module 388 can detect, in the response, elements removed from the set of elements previously received and deleting the elements from the user interface for the web page to reflect removal from the set of elements without refreshing other elements in the set of elements in the user interface (e.g., by the updating module 398). The removed elements may be detected by element removal detector 396.

FIG. 4A-4C graphically depicts an example of how displayed elements in object 400 are partially updated in a user interface based on a received web server response 425.

The table 400 of FIG. 4A depicts an example of a user interface object 400 which elements which can be partially updated (e.g., without refreshing the entire user interface or the entire user interface object 400). The object 425 depicts a response received from a server or other information source with current values for 'CPU' and 'Memory' usage for the 'Firefox' process. The values associated with 'CPU' and 'Memory' usage can be detected as elements that are partially updatable and in response to detecting that the value for 'Memory' usage in the response object 425 has been updated from the object 400 which was previously received and displayed, the element 'value' for 'memory' can be refreshed in the screen, as shown in the updated object 450.

In generating the updated object 450 in the user interface, only the element 'value' of 'memory' needs to be updated, such that other elements need not be refreshed. In addition, in the response 425 received from the server/content source, a new information 402 may be detected. In such an instance, the new elements can be added as shown in the displayed object 450, without refreshing/updating the entire object.

Figure 5A:
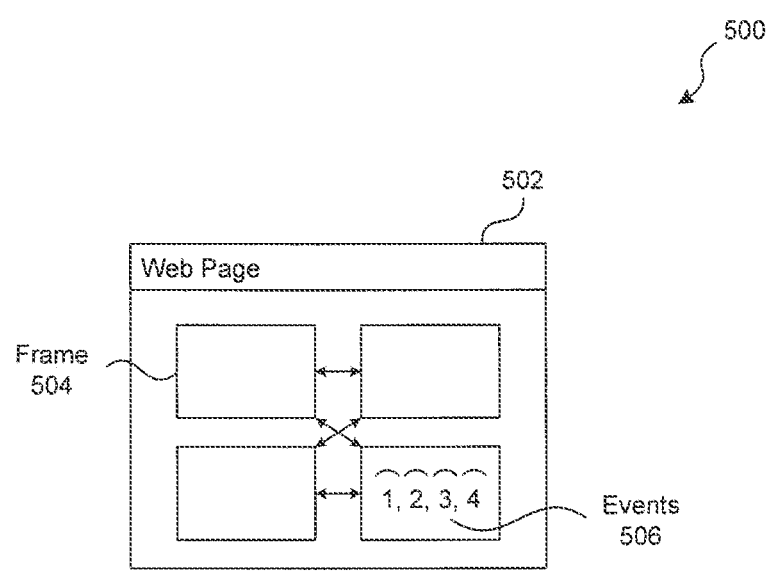
FIG. 5A depicts a graphical diagram of multiple applications running inside individual frames on a web page.

FIG. 5A depicts a graphical diagram 500 of multiple applications running inside individual frames 504 on a web page 502.

In general, the requests received in each frame can be handled on a frame-by-frame basis, independent of the other frames in the same windowing environment (e.g., a web page, web browser, or a general browser). For example, when a link is clicked, a series of events 506 occurs in the frame in which the click occurred. The link can he loaded in the same frame in which it was selected, independent of the other frames on the web page and that each of the multiple frames performs its own load and unload operations, independent of the other frames. This can be achieved by tracking document elements, capturing link clicks, and form submissions, etc. such that requests and responses are contained within the elements/frames.

Figure 5B:
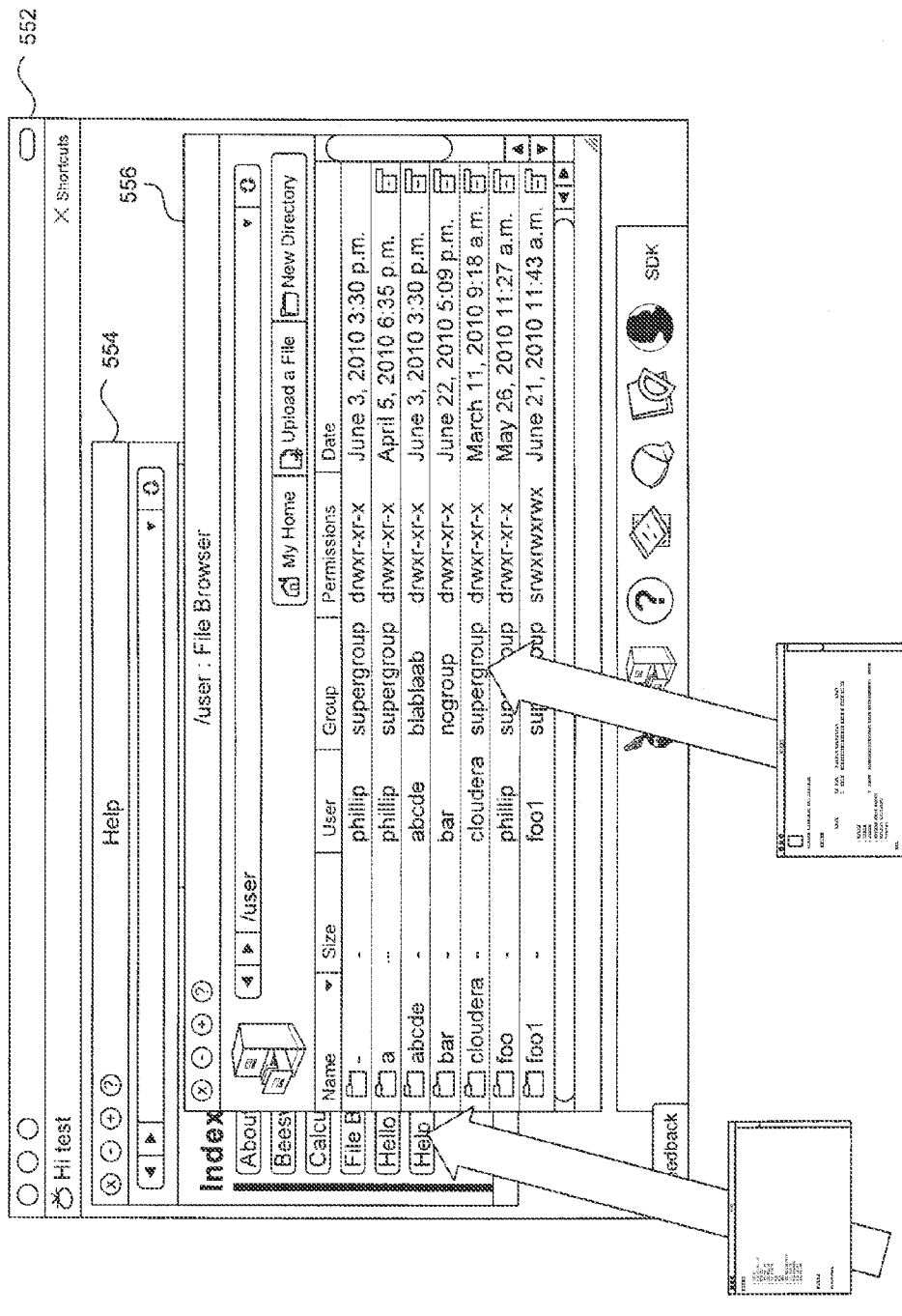
FIG. 5B depicts an example of a windowing environment having a user interface with two frames, each capable of handling its own server request and response.

While the frames 504 perform independent actions and can maintain, store, and update their individual states, the frames are typically capable of interacting with one another and are aware of the presence of other frames in the same windowing environment. In some instances, the frames and the applications loaded in the frames are capable of sharing common resources and as such, shared resource among any of the multiple frames can be loaded once and used among the applications in the same windowing environment (e.g., browser or web page). FIG. 5B depicts another example of a windowing environment 552 having a user interface with two frames 554 and 556, each capable of handling its own server request and response, while being aware of each others presence and are able to communicate with one another for resource sharing and other actions.

Figure 6A:
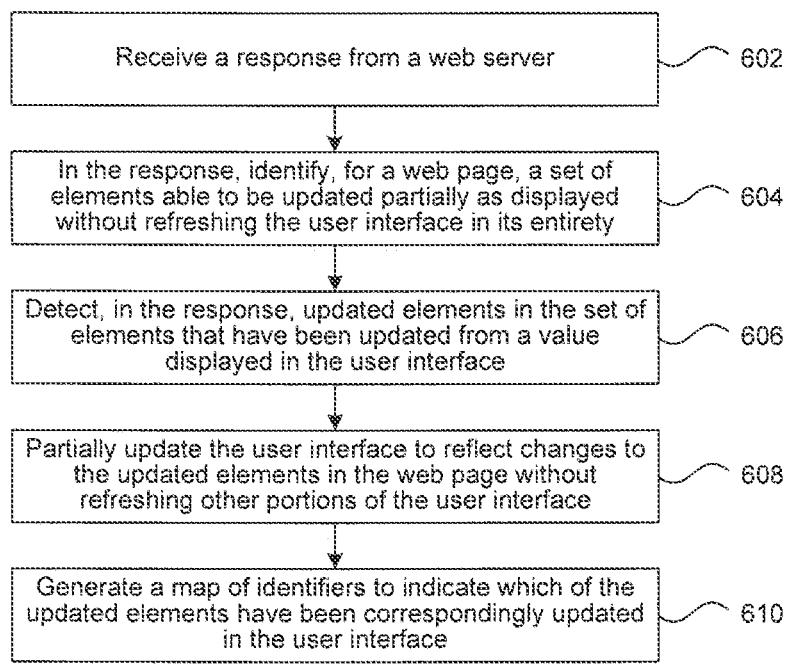
FIG. 6A-C depicts flowcharts showing an example process for partially updating displayed objects in a user interface to reflect changes to the updated elements in the web page without refreshing other portions of the user interface.
Figure 6B:
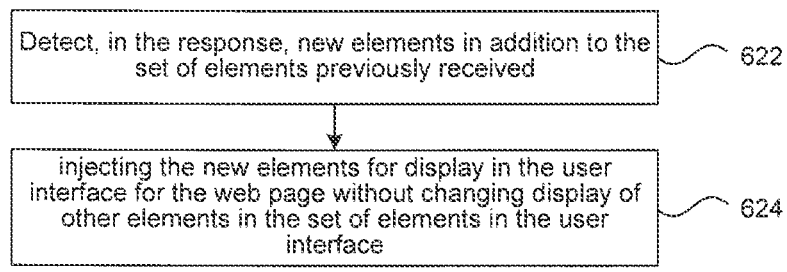
Figure 6C:
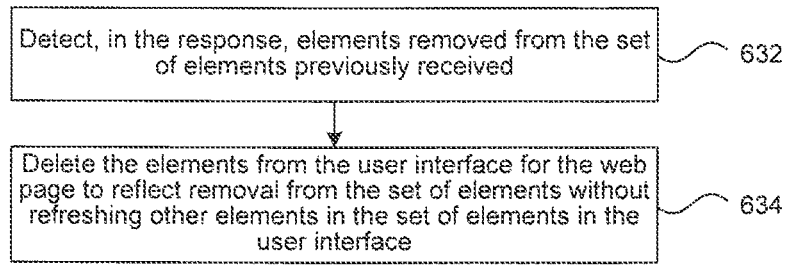

FIG. 6A-C depicts flowcharts showing an example process for partially updating displayed objects in a user interface to reflect changes to the updated elements in the web page without refreshing other portions of the user interface.

In process 602, a response is received from a web server. The response is, for example, an HTTP response received when an HTTP request is made. In process 604, a set of elements able to be updated partially as displayed without refreshing the user interface in its entirety, are identified in the response. In process 606, elements in the set of elements that have been updated from a value displayed in the user interface are detected in the response. In process 608, the user interface is partially updated to reflect changes to the updated elements in the web page without refreshing other portions of the user interface.

The web page can include multiple frames, each of the multiple frames including different applications which handle corresponding requests to the web server independent of the other applications loaded in other frames in the web page. The partial updating can occur, in a frame of the user interface, wherein, the frame contents are unloaded or loaded independent of other frames in the web page. In addition, the partial updating occurs in a frame where the results of the web server response are rendered in the frame of the web page in which an event triggering the web server response was generated, independent of other frames. In general, each of the multiple frames maintains its own state independent of other frames in the web page and shared resource among any of the multiple frames can be loaded once and shared among the frames.

The process can in addition or in alternate, detect new elements in addition to the set of elements previously received, in step 622 and the new elements can be injected for display in the user interface for the web page without changing display of other elements in the set of elements in the user interface, in process 624, as shown in the example of FIG. 6B. Similarly, elements removed from the set of elements previously received can also be detected in process 632 and detected from the user interface or the web page to reflect removal from the set of elements without refreshing other elements in the set of elements in the user interface in process 634, as shown in the example of FIG. 6C.

Figure 7:
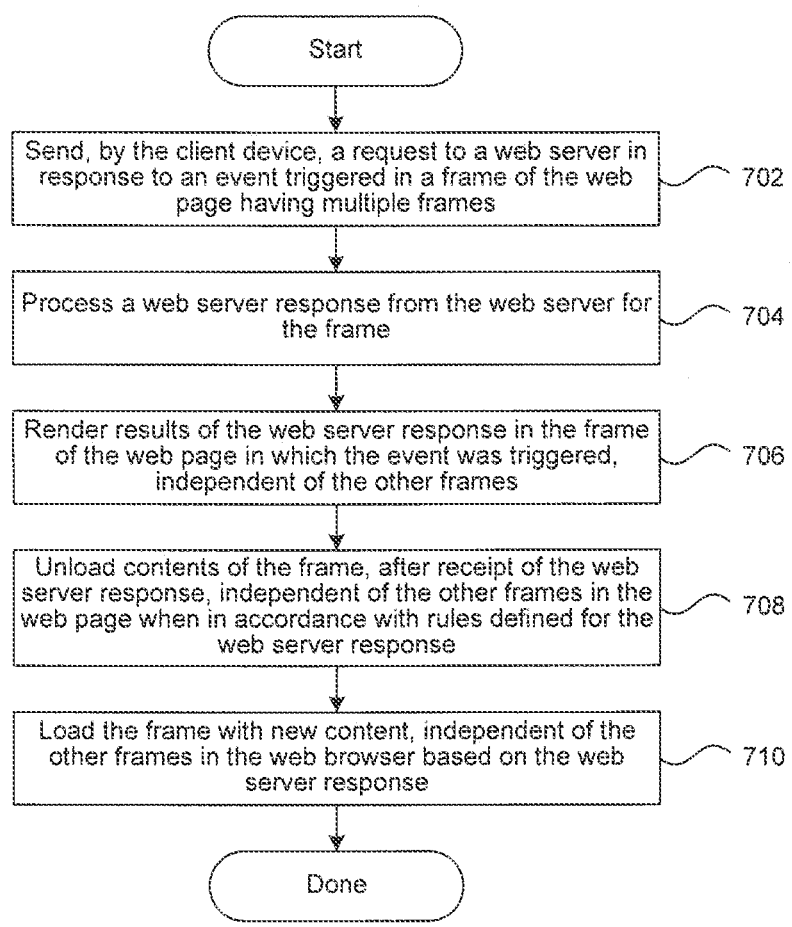
FIG. 7 depicts a flowchart of an example process for implementing interactive elements in a web page.

FIG. 7 depicts a flowchart of an example process for implementing interactive elements in a web page.

In process 702, the client device can send a request to a web server in response to an event triggered in a frame of the web page having multiple frames. The request can include an HTTP request or XML, HTTP request (XHR). In one embodiment, each of the multiple frames of the web page includes different applications which handle corresponding requests to the web server independent of the other applications loaded in other frames in the web page.

In general, each of the multiple frames maintains its own state independent of the other frames. In addition, each of the multiple frames performs its own load and unload operations, independent of the other frames. However, each frame is aware of the existence and activity of the other frames and can share any common resources. For example, shared resource among any of the multiple frames can be loaded once on the web page, and rendered in multiple frames.

The event triggering the request can include, for example, a form click, a link selection, or any custom calls. In one embodiment, when the triggering event is a link selection by a user, custom actions can be performed. In general, as a result, the link is loaded in the frame in which the link was selected, independent of the other frames on the same web page or windowing environment.

In process 704, a web server response from the web server for the frame is processed, for example, in accordance with rules defined for the web server response. The rules can include, by way of example, one or more of, an alert response, a confirm response, and a default response. In general, the rules are modifiable and/or user-customizable. New rules may also be defined.

In process 706, results of the web server response are rendered in the frame of the web page in which the event was triggered, independent of the other frames. In process 708, contents of the frame are unloaded, after receipt of the web server response, independent of the other frames in the web page when in accordance with rules defined for the web server response. In process 710, the frame is loaded with new content, independent of the other frames in the web browser based on the web server response.

The contents of the frame can include interactive web page features that are defined using HTML markups. The contents of the frame may also include interactive web page features that are defined without using JavaScript. In one embodiment, the web page interacts with a distributed file system (e.g., the Hadoop distributed file system).

Figure 8:
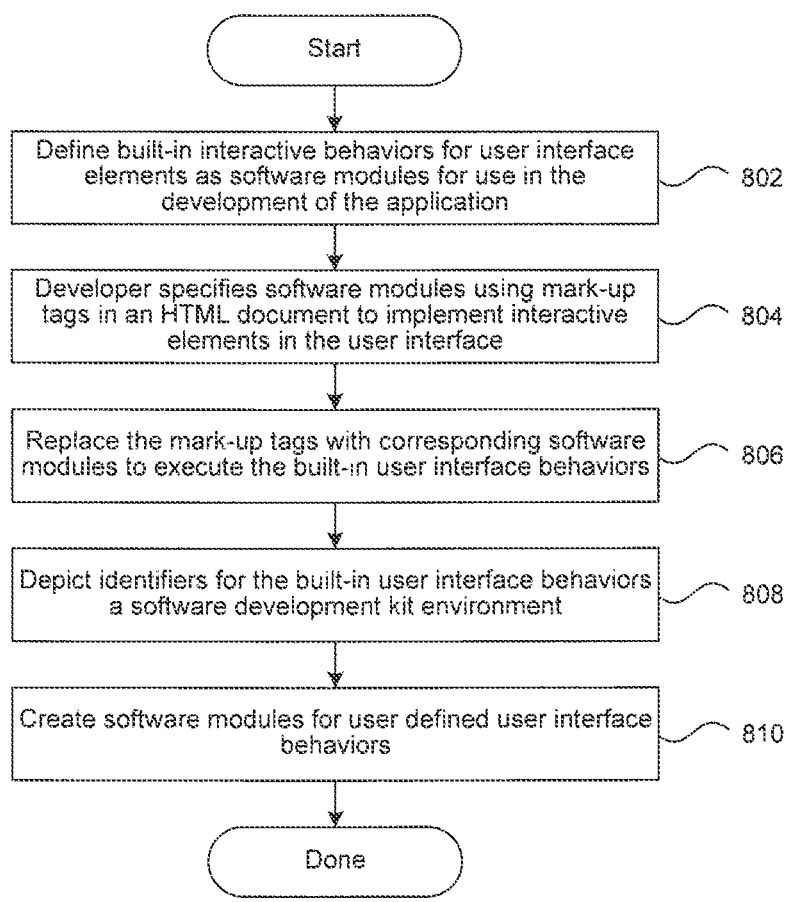
FIG. 8 depicts a flowchart of an example process for enabling development of a user interface without reliance on JavaScript.

FIG. 8 depicts a flowchart of an example process for enabling development of a user interface without reliance on JavaScript.

In process 802, built-in interactive behaviors are defined for user interface elements as software modules for use in the development of the application. The interactive behaviors can include, for example, alert or confirmation messages, form validators client side), right-click context menus (customizable), sortable tables, tabbed interface elements, tool tips, date selector, or other input form elements.

In process 804, a developer or user specifies software modules using mark-up tags in an HTML document to implement interactive elements in the user interface. Through declarative HTML, the developer need not rely on JavaScript to implement interactive UI features.

In process 806, the mark-up tags are replaced with corresponding software modules to execute the built-in user interface behaviors. In process 808, identifiers are depicted for the built-in user interface behaviors a software development kit environment. In addition, CSS files can be provisioned for the application. In addition, user interface behaviors can be user-definable. In process 810, software modules for user defined user interface behaviors are created. In one embodiment, the SDK is suited for development of applications to interact with a Hadoop-enabled clustered computing environment.

Figure 9:
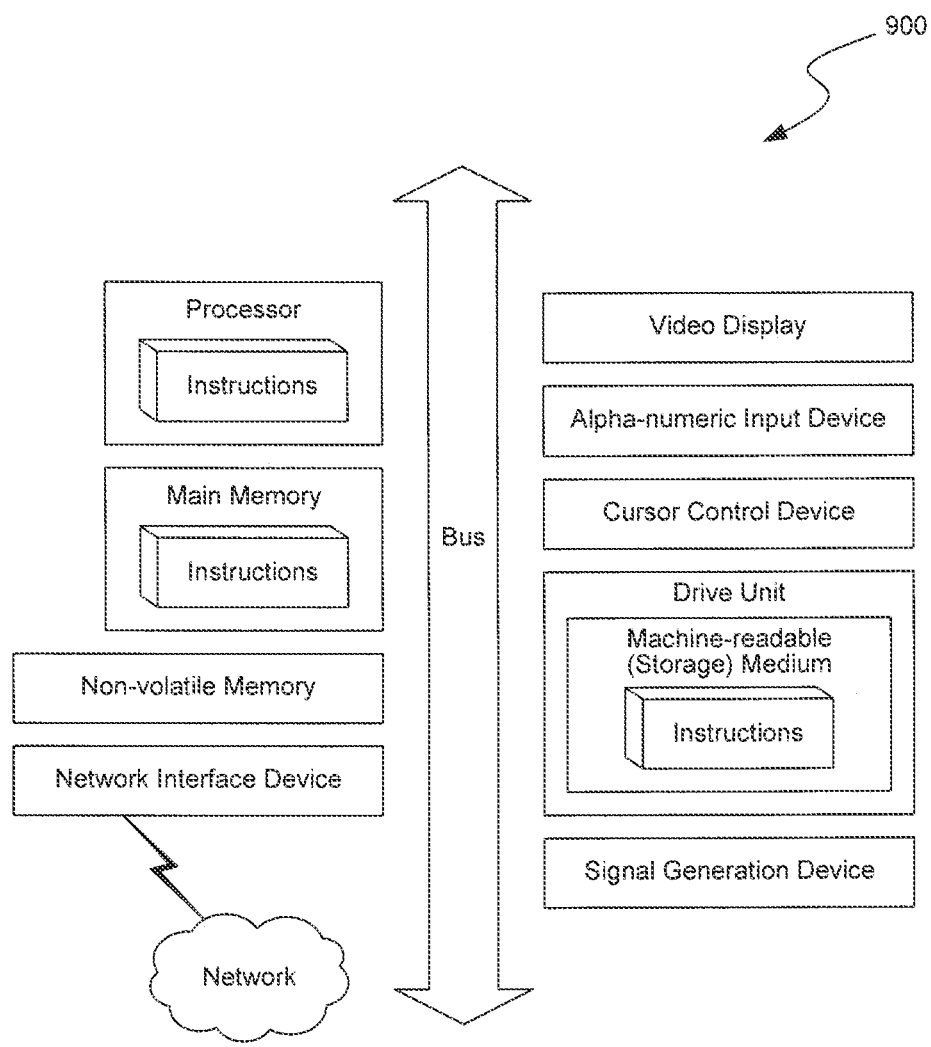
FIG. 9 shows a diagrammatic representation of a machine in the example form of a computer system within which a set of instructions, for causing the machine to perform any one or more of the methodologies discussed herein, may be executed.

FIG. 9 shows a diagrammatic representation of a machine in the example form of a computer system within which a set of instructions, for causing the machine to perform any one or more of the methodologies discussed herein, may be executed, In the example of FIG. 9, the computer system 900 includes a processor, memory, non-volatile memory, and an interface device. Various common components (e.g., cache memory) are omitted for illustrative simplicity. The computer system 900 is intended to illustrate a hardware device on which any of the components depicted in the example of FIG. 1 (and any other components described in this specification) can be implemented. The computer system 900 can be of any applicable known or convenient type. The components of the computer system 900 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to he part of the computer system 1900. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 1900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should he borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may he connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks. (DVDs), etc), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A client device, comprising:
a processor;
memory coupled to the processor, the memory having instructions stored thereon, which when executed by the processor, causes the processor to:
generate an HTTP request from an application of a frame in a user interface, wherein the frame is one of multiple frames in the user interface;
receive an HTTP response to the HTTP request, the HTTP response including a list of objects having all elements for the frame including at least one updated element having a value that is updated from a previous value;
parse the HTTP response to identify:
the at least one updated element;
at least one new element in addition to a set of elements previously received; and
at least one element removed from the set of elements previously received:
render the at least one updated element and the at least one new element in the frame from which the HTTP request was generated; and
delete the at least one element removed from the set of elements previously received from the frame from which the HTTP request was generated;
wherein changes to the frame are made without refreshing the user interface in its entirety; and
wherein the client device interfaces with a Hadoop distributed file system (HDFS) to receive the HTTP response.

2. A method of partially updating displayed objects in a user interface for a web page at a client device, the method, comprising:
in a response containing all elements for the user interface received from a web server, identifying a set of elements which can be updated locally without refreshing the user interface in its entirety;
parsing, in the response, to identify from the set of elements which can be updated locally, one or more updated elements that have been updated from a value displayed in the user interface;
detecting, in the response, new elements in addition to the set of elements previously received;
detecting, in the response, elements removed from the set of elements previously received;
partially updating the user interface to reflect changes to the updated elements in the web page, injecting the new elements for display in the user interface for the web page, and deleting the elements from the user interface for the web page to reflect removal from the set of elements, without refreshing other portions of the user interface;
generating a map of identifiers indicating which of the updated elements have been correspondingly updated in the user interface; and wherein the client device interfaces with a Hadoop distributed file system (HDFS) to receive the HTTP response.

3. The method of claim 2, further comprising, comparing received values for the set of elements with a set of previously stored values to detect the updated elements.

4. The method of claim 2, wherein, the response includes an HTTP response.

5. The method of claim 2, wherein, the web page comprises multiple frames, each of the multiple frames including different applications which handle corresponding requests to the web server independent of the other applications loaded in other frames in the web page.

6. The method of claim 2, wherein, the partial updating occurs in a frame of the user interface, wherein, the frame contents are loaded independent of other frames in the web page.

7. The method of claim 2, wherein, the partial updating occurs in a frame of the user interface, wherein, the frame contents are unloaded independent of other frames in the web page.

8. The method of claim 2, wherein, the partial updating occurs in a frame of the user interface, wherein, results of the web server response are rendered in the frame of the web page in which an event triggering the web server response was generated, independent of other frames.

9. The method of claim 2, wherein, the frames include interactive web page features that are defined using HTML mark-ups.

10. The method of claim 2, wherein, the frame includes interactive web page features that are defined without using JavaScript.

11. The method of claim 5, wherein, each of the multiple frames maintains its own state independent of other frames in the web page.

12. The method of claim 5, wherein, shared resource among any of the multiple frames can be loaded once.

13. The method of claim 2, wherein, the client device interacts with a distributed file system.

14. The method of claim 13, wherein, the distributed file system is the Hadoop distributed file system.

15. A device, comprising:
a processor;
memory coupled to the processor, the memory having instructions stored thereon, which when executed by the processor, causes the processor to:
identify at the device, a set of elements within a frame which can be updated locally without refreshing the frame in its entirety, in a response received from a web server containing all elements for the frame,
wherein the response from the web server is received in response to a request from the frame of the web page that is based on an event triggered at the device by a user action in the frame;
compare received values, at the device, for the set of elements with a set of previously stored values;
parse, in the response, to detect from the set of elements,
one or more updated elements that have been updated from a value displayed in the frame;
one or more new elements in addition to the set of previously stored values; and
one or more elements removed from the set of previously stored values;
partially update the frame to reflect changes to the updated elements in the web page, inject the one or more new elements for display in the user interface for the web page and delete the one or more elements from the user interface for the web page to reflect removal from the set of previously stored values, without refreshing other portions of the frame; and wherein, the device interacts with a Hadoop distributed file system (HDFS).

16. A server, comprising:

a processor;

a memory coupled to the processor, the memory having instructions stored thereon, which when executed by the processor, causes the processor to:

generate an HTTP response to an HTTP request, the HTTP response including a list of objects having a set of elements, the set of elements including:

at least one updated element having a value that is updated from a previous value; and at least one new element in addition to a set of elements in a previous HTTP response; and transmit the HTTP response to a client device which generated the HTTP request, wherein the HTTP request is triggered from a frame in a user interface;

wherein the frame is one of multiple frames in the user interface;

wherein the HTTP response is parsed by the client device to:

identify the at least one updated element and the at least one new element in the set of elements;

identify at least one element removed from the set of elements;

render the at least one updated element and the at least one new element in the frame from which the HTTP request was triggered; and delete the at least one element from the frame from which the HTTP request was triggered to reflect removal of the at least one element from the frame;

wherein changes to the frame are made without refreshing the user interface in its entirety; and wherein the client device interfaces with a Hadoop distributed file system (HDFS) to receive the HTTP response.

17. The server of claim 16, configured to host applications providing user interfaces via which a user is able to interact with a computing cluster.

* * * * *